US010908757B2

(12) United States Patent
Hong et al.

(10) Patent No.: US 10,908,757 B2
(45) Date of Patent: Feb. 2, 2021

(54) ROLLABLE DISPLAY PANEL AND ROLLABLE DISPLAY DEVICE HAVING THE SAME

(71) Applicant: SAMSUNG DISPLAY CO., LTD., Yongin-si (KR)

(72) Inventors: Won-Ki Hong, Yongin-si (KR); Young-Jun Seo, Yongin-si (KR); Tae-Hee Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/709,761

(22) Filed: Dec. 10, 2019

(65) Prior Publication Data

US 2020/0142522 A1 May 7, 2020

Related U.S. Application Data

(63) Continuation of application No. 16/452,945, filed on Jun. 26, 2019, now Pat. No. 10,534,495, which is a continuation of application No. 15/708,557, filed on Sep. 19, 2017, now Pat. No. 10,359,900.

(30) Foreign Application Priority Data

Oct. 19, 2016 (KR) .................. 10-2016-0135706

(51) Int. Cl.
*G06F 3/045* (2006.01)
*G06F 1/16* (2006.01)
*G01B 7/02* (2006.01)

(52) U.S. Cl.
CPC ............. *G06F 3/045* (2013.01); *G01B 7/026* (2013.01); *G06F 1/1626* (2013.01); *G06F 1/1652* (2013.01); *G06F 2203/04102* (2013.01)

(58) Field of Classification Search
CPC ............... G06F 3/045; G06F 1/1652; G06F 2203/04102
See application file for complete search history.

(56) References Cited

U.S. PATENT DOCUMENTS

| 2013/0265221 A1 | 10/2013 | Lee et al. |
| 2014/0101560 A1 | 4/2014 | Kwak et al. |
| 2014/0104166 A1 | 4/2014 | Kim |
| 2016/0212837 A1 | 7/2016 | Kim |
| 2017/0060189 A1 | 3/2017 | Sohn et al. |
| 2018/0032106 A1* | 2/2018 | Yu .................. G06F 1/1652 |

FOREIGN PATENT DOCUMENTS

KR 10-2014-0022180 A 2/2014

* cited by examiner

*Primary Examiner* — Lisa S Landis
(74) *Attorney, Agent, or Firm* — Lewis Roca Rothgerber Christie LLP

(57) ABSTRACT

A rollable display panel and a rollable display device, the rollable display panel including a display region configured to display an image; a non-display region surrounding the display region; and a resistor sensor in the non-display region including sensing material of which resistance values are different by location, wherein the resistor sensor outputs a sensing signal that is regularly changed proportional to a rolling length of the rollable display panel, and a sensor driver that determines a driving region of the rollable display panel based on the sensing signal.

7 Claims, 17 Drawing Sheets

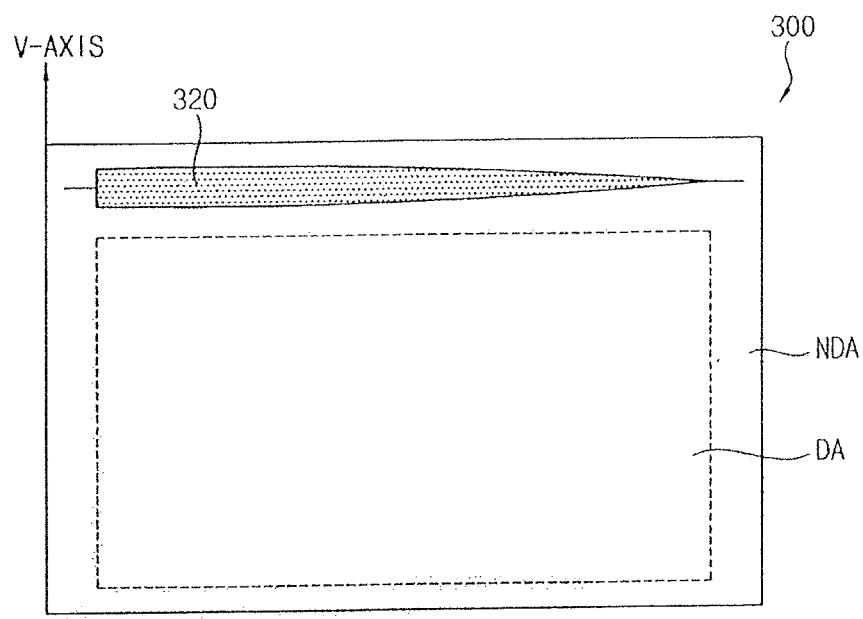
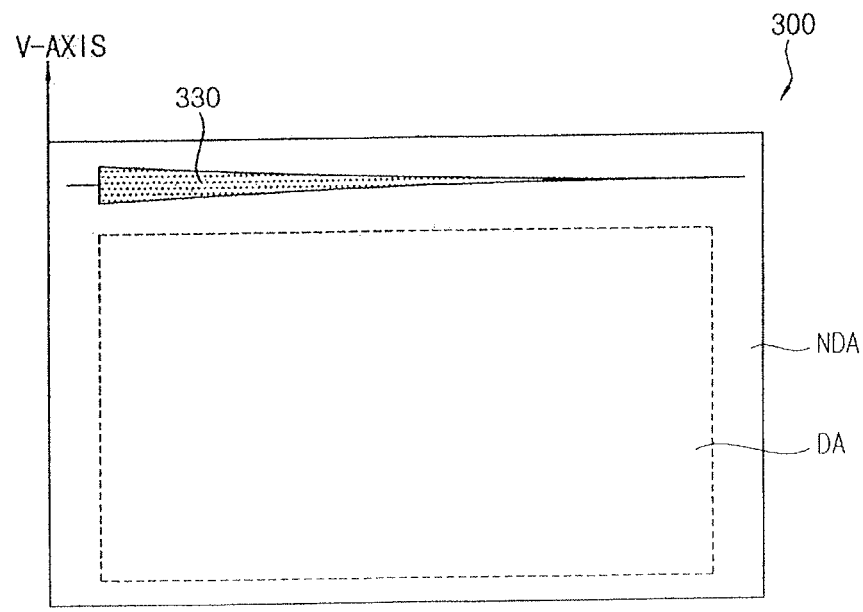

ROLLABLE DISPLAY PANEL AND ROLLABLE DISPLAY DEVICE HAVING THE SAME

CROSS-REFERENCE TO RELATED APPLICATIONS

This application is a continuation of application Ser. No. 16/452,945, filed on Jun. 26, 2019, which is a continuation of application Ser. No. 15/708,557, filed Sep. 19, 2017, now U.S. Pat. No. 10,359,900, issued on Jul. 23, 2019, which claims priority to and the benefit of Korean Patent Application No. 10-2016-0135706, filed on Oct. 19, 2016 the entire content of each of which is incorporated herein by reference.

BACKGROUND

1. Field

Embodiments relate to a rollable display panel and a rollable display device having the same.

2. Description of the Related Art

Recently, flexible display devices and rollable display devices having flexibility are studied. The rollable display device may be carried by rolling a display panel or may be used by spreading all of or partial of the display panel.

SUMMARY

The embodiments may be realized by providing a rollable display device including a display region configured to display an image; a non-display region surrounding the display region; a resistor sensor in the non-display region including sensing material of which resistance values are different by location, wherein the resistor sensor outputs a sensing signal that is regularly changed proportional to a rolling length of the rollable display panel; and a sensor driver that determines a driving region of the rollable display panel based on the sensing signal, wherein the resistor sensor outputs the sensing signal based on a sum of the resistance values of the sensing material.

The resistance value resistance value of the sensing material changes according to a pressure applied thereto.

The resistor sensor may further include a first electrode and a second electrode coupled to ends of the sensing material.

The resistance value of the sensing material may increase as a curvature of the rollable display panel decreases.

The sensing material may have a triangle shape of which an area decreases as the curvature decreases when viewed on a plane view.

The sensing material may be continuously formed.
The sensing material may be discontinuously formed.
The sensing material of the sensing resistor may include a plurality of different sensing materials of which resistance values are different from each other according to the curvature of the rollable display panel.

The sensing material of the sensing resistor may have the resistance value that decreases as the curvature increases.

A height of the sensing material may gradually decrease as the curvature decreases.

The resistor sensor may further include an insulation layer on the sensing material.

The sensing material may include a metal material.

The sensing material may be arranged in a U shape of which a vertical length gradually increases as the curvature decreases.

The sensing material may be arranged in a U shape of which a horizontal width gradually decreases as the curvature decreases.

The sensing material may include lead zirconate titanate (PZT) or polyvinylidene fluoride (PVDF).

The sensing material may include low-temperature poly silicon (LTPS), molybdenum disulfide ($MoS_2$), or amorphous silicon (a-Si).

The sensing material may include a metal nanowire, a metal nanoparticle, silicon (Si), a carbon nanotube (CNT), indium tin oxide (ITO), graphene, or indium gallium zinc oxide (IGZO).

The resistor sensor may be in the non-display region at a side of the display region.

The resistor sensor may be in the non-display region disposed at two sides of the display region.

The resistance value of the sensing material in the non-display region at one side of the display region may increase along a first direction, and the resistance value of the sensing material in the non-display region disposed at the other side of the display region may increase along a second direction, the second direction being opposite to the first direction.

The resistor sensor may be in the rollable display panel.
The resistor sensor may be implemented as a film and attached on the rollable display panel.

The embodiments may be realized by providing a rollable display panel including a display region configured to display an image; a non-display region surrounding the display region and including a first region and a second region of which curvatures are different; and a resistor sensor including a sensing material in which a first resistance value that is a resistance value of the first region and a second resistance value that is a resistance value of the second region are differently formed.

The first resistance value and the second resistance value may change according to a pressure applied thereto.

The first resistance value of the first region may be smaller than the second resistance value of the second region when the curvature of the first region is bigger than the curvature of the second region.

The sensing material may have a triangle shape of which an area toward the second region as the curvature decreases when the curvature of the first region is bigger than the curvature of the second region.

The sensing material may be continuously formed.
The sensing material may be discontinuously formed.
The sensing material of the sensing resistor may include a plurality of different sensing material of the first region and the sensing material of the second region may be different from each other.

The first resistance value of the sensing material in the first region may be smaller than the second resistance value of the sensing material in the second region when the curvature of the first region is bigger than the curvature of the second region.

A height of the sensing material may gradually decrease toward the second region when the curvature of the first region is bigger than the curvature of the second region.

The sensing material may include a metal material.
The sensing material may be arranged in a U shape of which a vertical length gradually increases toward the second region when the curvature of the first region is bigger than the curvature of the second region.

The sensing material may be arranged in a U shape of which a horizontal width gradually decreases toward the second region when the curvature of the first region is bigger than the curvature of the second region.

The resistor sensor may be in the non-display region at a side of the display region.

The resistor sensor may be in the non-display region disposed at two sides of the display region.

The first resistance value may be smaller than the second resistance value of the resistor sensor in the non-display region at one side of the display region, and the first resistance value may be bigger than the second resistance value of the resistor sensor in the non-display region disposed at the other side of the display region.

BRIEF DESCRIPTION OF THE DRAWINGS

Features will be apparent to those of skill in the art by describing in detail exemplary embodiments with reference to the attached drawings in which:

FIGS. 6A and 6B illustrate other example embodiment of a resistor sensor included in the rollable display panel of FIG. 1.

DETAILED DESCRIPTION

Figure 1:
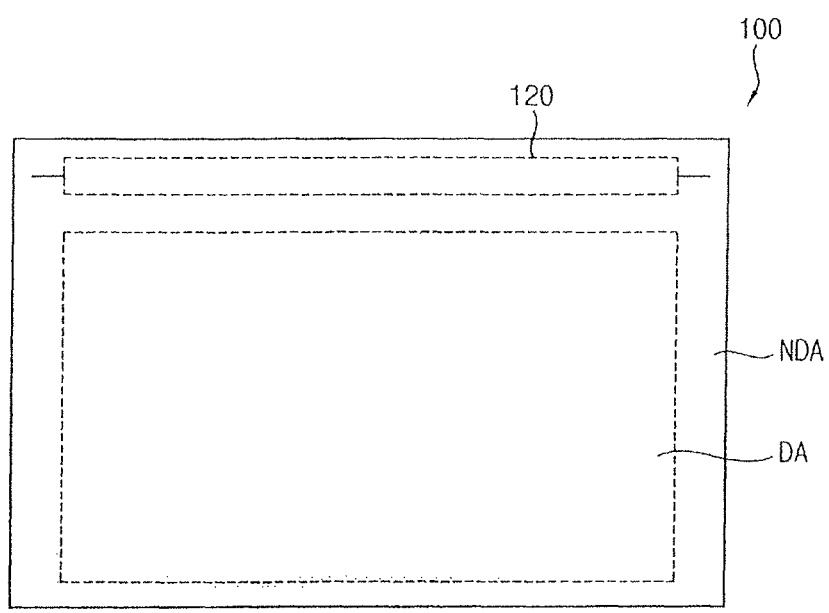
FIG. 1 illustrates a rollable display panel according to example embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
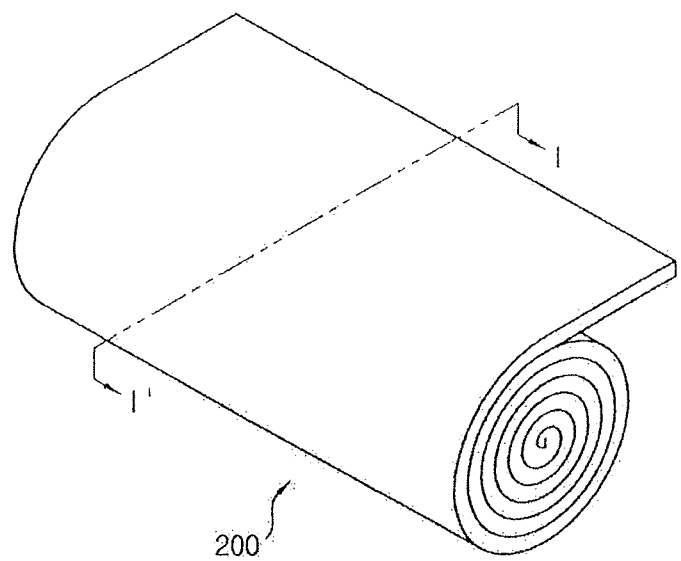
FIGS. 2 and 3 illustrate different views for describing the rollable display panel of FIG. 1.
Figure 3:
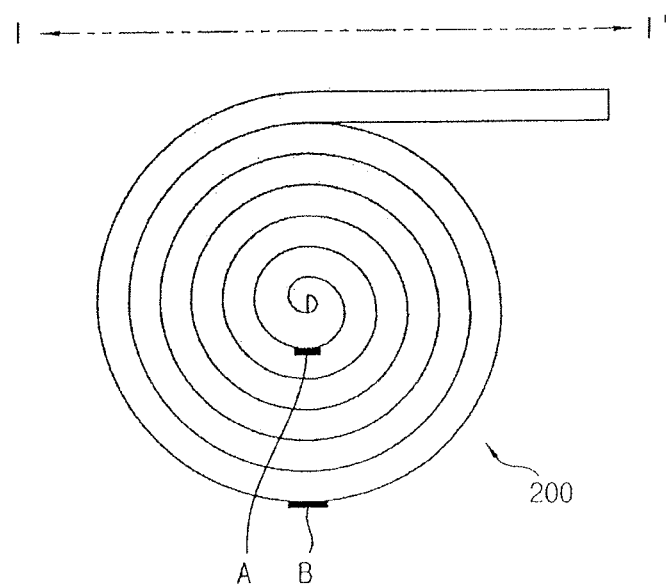
Figure 4:
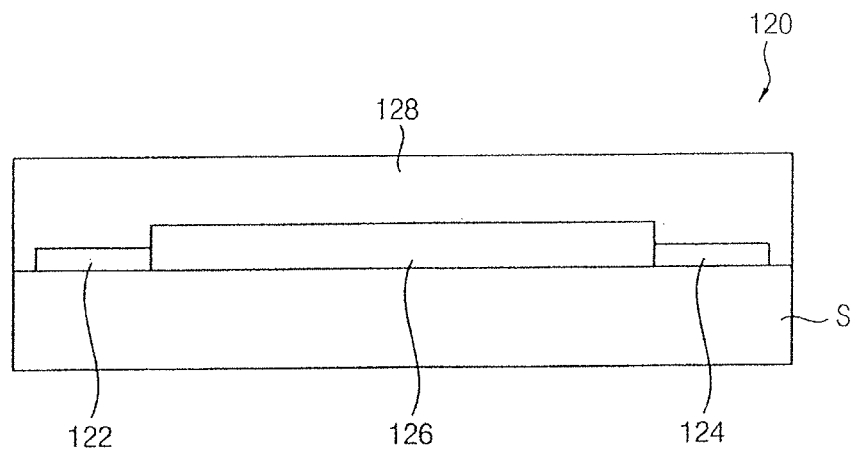
FIG. 4 illustrates a cross-sectional view of a resistor sensor included in the rollable display panel of FIG. 1.

FIG. 1 illustrates a rollable display panel according to example embodiments. FIGS. 2 and 3 illustrate different views of the rollable display panel of FIG. 1. FIG. 4 illustrates a cross-sectional view of a resistor sensor included in the rollable display panel of FIG. 1.

Referring to FIG. 1, a rollable display panel 100 may include a display region DA, a non-display region NDA, and a resistor sensor 120.

The display region DA, the non-display region NDA, and the resistor sensor 120 may be formed on a substrate. For example, the substrate may be a transparent resin having flexibility.

An image may be displayed on the display region DA. A plurality of pixels may be formed in the display region DA. Each of the pixels may be formed in an intersection region of a data line and a scan line. Each of the pixels may emit light corresponding to a data line provided through the data line.

The non-display region NDA may surround the display region DA. A circuit providing signals to the pixels, pads connecting an external integration circuit to the rollable display panel 100, etc. may be formed in the non-display region NDA. The non-display region NDA may include a first region NDA1 and a second region NDA2 of which a curvature of the rollable display panel 100 is different.

Further, the resistor sensor 120 may be disposed in the non-display region NDA. A resistor or resistance value of the resistor sensor 120 may be different according to the curvature of the rollable display panel 100 when the rollable display panel 100 is rolled. For example, the resistance value of the resistor sensor 120 may vary, and may depend upon the curvature of the rolled display panel 100. The sensing material having a first resistance value may be formed in the first region NDA1 and the sensing material having a second resistance value area may be formed in the second region NDA2. The rollable display panel 200 may be rolled as depicted in FIGS. 2 and 3. The image may not be displayed on a rolling area of the rollable display panel 200. Thus, power consumption of the rollable display panel 200 may be advantageously decreased. The resistance value of the resistor sensor may be changed when the rollable display panel 200 is rolled. For example, the rolling area may be recognized by the resistor sensor. A curvature of the rollable display panel 200 may be different according to a position of the rollable display panel 200. For example, as may be seen in FIG. 3, the curvature of the first region NDA1 and the curvature of the second region NDA2 may be different. For example, when the rollable display panel 200 is rolled, the curvature of an inner side or area (the first region NDA1)) of the rollable display panel may be bigger (e.g., more tightly curved or a smaller radius of curvature) than the curvature of outer side or area (the second region NDA2) of the rollable display panel 200. If a resistor sensor having a same or uniform resistance value were to be formed in the rollable display panel, the resistance value could be more changed in the first region NDA1 than in second region NDA2. Thus, the change of the resistance value in the position B may not be exactly detected. The rollable display panel 100 of FIG. 1 may include the resistor sensor 120 having a different resistance value according to the position (e.g., along the resistor sensor 120). Hereinafter, the rollable display panel 100 of FIG. 1 will be described in detail referring to FIGS. 4 through 11.

Referring to FIG. 4, the resistor sensor 120 may include a first electrode 122, a second electrode 124, and a sensing material 126. The first electrode 122, the second electrode 124, and the sensing material 126 may be formed on the substrate S. For example, the substrate S may be a transparent resin having flexibility. In an implementation, the resistor sensor 120 may further include an insulation layer 128 formed on the first electrode 122, the second electrode 124, and the sensing material 126.

The first electrode 122 and the second electrode 124 may be coupled to a sensor driver coupled to the rollable display panel. The resistance value of the sensing material 126 may be changed by or in response to a pressure applied thereto. That is, the first resistance value that is a resistance value of the sensing material 126 formed in the first region NDA1 and the second resistance value that is a resistance value of the sensing material 126 formed in the second region NDA2 may be changed by or in response to the pressure applied thereto. The bigger the change of the resistance value, the bigger the resistance value of the resistor sensor 120.

The first electrode 122 and the second electrode 124 may be coupled to the sensor driver coupled to the rollable display panel. The resistance value of the sensing material may be changed by external pressure. When the resistance value of the resistor sensor 120 increases, an amount of change of the resistance value may increase. For example, as the resistance value increases, the sensitivity of the resistor sensor corresponding to the pressure may increase. In contrast, when the resistance value of the resistor sensor 120 decreases, the amount of the change of the resistance value may decrease. For example, as the resistance value decreases, the sensitivity of the resistor sensor corresponding to the pressure may decrease. Thus, the resistance value of the resistor sensor 120 may decrease as the curvature of the rollable display panel increases. For example, the sensitivity of the resistor sensor may increase as the curvature of the rollable display panel decreases. Thus, the rolling area may be exactly detected by the resistor sensor 120. Here, as an area of the sensing material 126 increases, the resistance value of the resistor sensor 120 may decrease. As the area of the sensing material 126 decrease, the resistance value of the resistor sensor 120 may increase.

In some example embodiments, the sensing material 126 may have a triangle shape of which an area decreases toward the second region NDA2 as the curvature decreases when the curvature of the first region NDA1 is bigger than the curvature of the second region NDA2 when viewed on a plane view. That is, the sensing material 126 may be formed in a triangle shape of which an area is gradually decreased as the curvature is decreased in a plane view. For example, the sensing material 126 of the resistor sensor 120 may extend lengthwise along a rolling/unrolling direction of the display device. The sensing material 126 may be have a triangular shape in which the base of the triangle is adjacent to one end of the display in an unrolled state and adjacent to a center, inner core, or rolling axis (e.g., V-axis of FIG. 5) of the display in a rolled state. The point of the triangle may be adjacent to an end of the display that is distal to the above-described one end of the display in the unrolled state and adjacent to an outer side of the display in a rolled state. Being a triangle, a width of the sensing material 126 decreases from the base to the point, e.g., along a direction from the one end of the display to the other end of the display in the unrolled state. In an implementation, the second material having the triangle shape may be linearly (e.g., continuously) or discretely (e.g., discontinuously) formed. In an implementation, the sensing material 126 of the first region NDA1 and the second material of the second region NDA2 may be different from each other. Here, the first resistance value of the sensing material 126 in the first region NDA1 may be smaller than the second resistance value of the sensing material 126 in the second region NDA2 when the curvature of the first regions NDA1 is bigger than the curvature of the second region NDA2. That is, the resistor sensor 120 may include a plurality of sensing materials 126 of which the resistance values are different from each other according to the curvature of the rollable display panel 100, e.g., according to a position along the lengthwise direction of the display panel 100. For example, the resistor sensor 120 may include the sensing material 126 that decreases as the curvature increases. For example, the resistor sensor 120 may include the sensing material 126 having the smallest resistance value in the area of which curvature is the biggest. The resistor sensor 120 may include the sensing material 126 having the biggest resistance value in the area of which curvatures is the smallest. In an implementation, a height of the sensing material 126 may gradually decrease toward the second region NDA2 when the curvature of the first region NDA1 is bigger than the curvature of the second region NDA2. That is, the resistor sensor 120 may include the sensing material 126 of which a height gradually decreases as the curvature decreases. In an implementation, the sensing material 126 may be linearly or discretely formed. In an implementation, the sensing material 126 may be arranged in a U shape of which vertical length gradually increases or of which horizontal width gradually decreases toward the second region NDA2 when the curvature of the first region NDA1 is bigger than the curvature of the second region NDA2. That is, the resistor sensor 120 may be formed in the U shape of which a vertical length (e.g., a length of arms of the U) gradually increases or of which horizontal width (e.g., a distance between arms of the U) gradually decreases as the curvature decrease. The U shape may have concave portions and protrusion portions. In an implementation, the sensing material 126 may include a metal material the same with the first electrode 122 and the second electrode.

In an implementation, the resistor sensor 120 may be formed in the non-display region NDA at a side of the display region DA. In an implementation, the resistor sensor 120 may be formed in the non-display region NDA disposed on two, e.g., both, side of the display region DA. In an implementation, the resistance value of the resistor sensor 120 in the non-display region NDA at one side of the display region may increase according to or along a first direction, and the resistance value of the resistor sensor 120 in the non-display region NDA at the other side of the display region DA may increase according to or along a second direction (that is opposite to the first direction). Here, the resistor sensor 120 of which the first resistance value is smaller than the second resistance value may be formed in the non-display region NDA at one side of the display region DA and the resistor sensor 120 of which the first resistance value is bigger than the second resistance value may be formed in the non-display region at other side of the display region. Thus, the rolling area of the rollable display panel 100 may be exactly detected when the rollable display panel is rolled in both direction (e.g., the first direction and the second direction).

The sensing material 126 may include various materials. As described above, the sensing material 126 may include the metal material when the sensing material 126 is formed in the U shape. In an implementation, the metal material may include at least one of, e.g., titanium (Ti), molybdenum (Mo), copper (Cu), aluminum (Al), or the like. In an implementation, the sensing material 126 may include at least one of, e.g., lead zirconate titanate (PZT) and polyvinylidene fluoride (PVDF). In an implementation, the sensing material 126 may include at least one of, e.g., low-temperature poly silicon (LTPS), molybdenum disulfide (MoS2), and amorphous silicon (a-Si). In this case, the resistor sensor 120 may be formed in a manufacture process of forming pixels of the rollable display panel 100 using low-temperature poly silicon (LTPS), molybdenum disulfide (MoS2), and amorphous silicon (a-Si). In an implementation, the sensing material 120 may include at least one of, e.g., a metal nanowire, a metal nanoparticle, silicon (Si), a carbon nanotube (CNT), indium tin oxide (ITO), graphene, and indium gallium zinc oxide (IGZO). In this case, the resistor sensor 126 may be implemented as a film and may be attached to the rollable display panel 100. In an implementation, the resistor sensor may be integrated in a touch sensor panel and be attached to the rollable display panel 100.

As described above, the rollable display panel 100 may exactly detect the rolling area of the rollable display panel 100 by including the resistor sensor 120 of which the resistance values are different according to the curvature of the rollable display panel 100.

Figure 5:
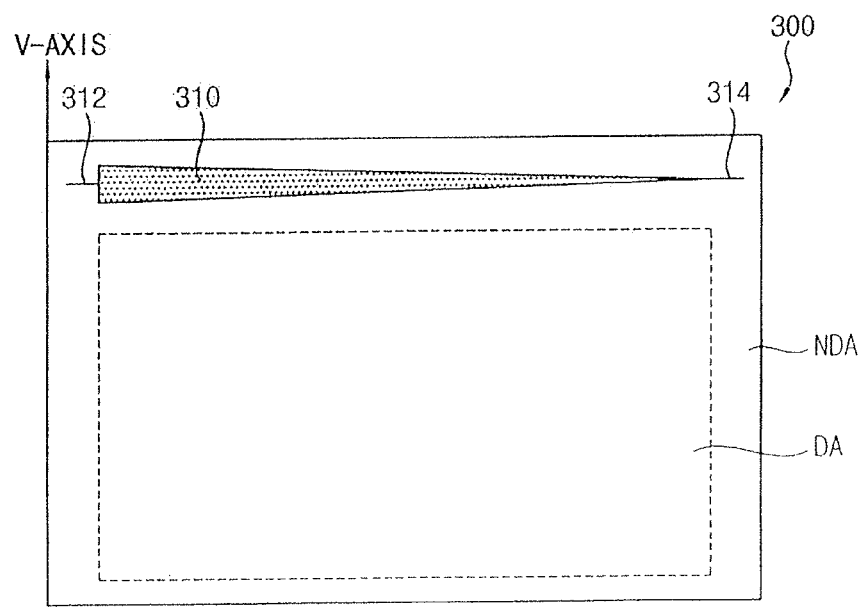
FIG. 5 illustrates a resistor sensor included in the rollable display panel of FIG. 1.

FIG. 5 illustrates an example embodiment of a resistor sensor included in the rollable display panel of FIG. 1.

Referring to FIG. 5, the resistor sensor may be formed on the rollable display panel 300. The resistor sensor may include the sensing material 310, the first electrode 312, and the second electrode 314. The sensing material 310 may be formed in the triangle shape of which the area gradually decreases as the curvature decreases, e.g., in a direction extending away from the rolling axis of the display panel 300. The rollable display panel 300 of FIG. 5 may be rolled on the basis of a rolling or virtual axis V-AXIS. The curvature of the rollable display panel 300 may decrease in a direction moving away from the virtual axis V-AXIS. The resistance value of the resistor sensor may increase with increasing distance from the virtual axis V-AXIS because the resistance value of the resistor sensor decreases as the area of the sensing material 310 increases. For example, the sensitivity of the resistor sensor may increase as curvature decreases. Thus, the resistor sensor may exactly detect the rolling area although the curvature is small.

FIGS. 6A and 6B illustrate other example embodiments of a resistor sensor included in the rollable display panel of FIG. 1.

Referring to FIGS. 6A and 6B, the area of the sensing material 320, 330 may decrease as the curvature decreases, e.g., in a direction moving away from the rolling axis of the display. The rollable display panel 300 of the FIGS. 6A and 6B may be rolled on the basis of the rolling or virtual axis V-AXIS. Thus, the curvature may decrease with increasing distance from the virtual axis V-AXIS. The resistance value of the resistor sensor may increase with increasing distance from the virtual axis V-AXIS because the resistance value of the resistor sensor decreases as the area of the sensing material 320, 330 increases. Here, a shape of the sensing material 320, 330 may be transformed or selected according to a property of the sensing material 320, 330. Referring to 6A, the area of the sensing material 320 may only minutely decrease near to the virtual axis V-AXIS and may sharply decrease farther from the virtual axis V-AXIS. Referring to FIG. 6B, the area of the sensing material 330 may sharply decrease near to the virtual axis V-AXIS and may only minutely decrease farther from the virtual axis V-AXIS. Therefore, the resistor sensor may be sensitively operated even if only a weak pressure is put on to the area of which curvature is small because the resistance value of the resistor sensor increases as the curvature decreases. Thus, the resistor sensor may exactly detect the rolling area although the curvature is small.

Figure 7:
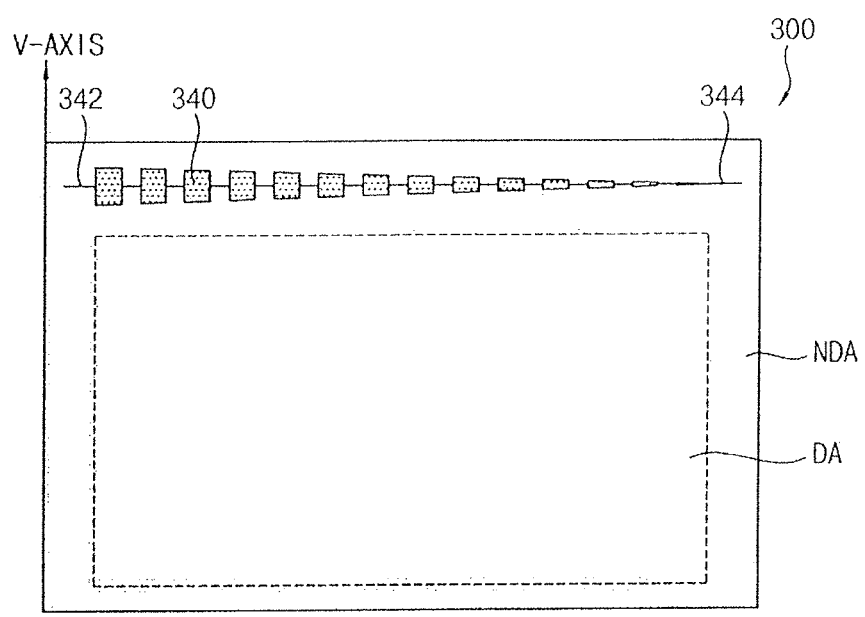
FIG. 7 illustrates another example embodiment of a resistor sensor included in the rollable display panel of FIG. 1.

FIG. 7 illustrates another example embodiment of a resistor sensor included in the rollable display panel of FIG. 1.

Referring to FIG. 7, the resistor sensor may be formed on the rollable display panel 300. The resistor sensor may include a sensing material 340, a first electrode 342, and a second electrode 344. The sensing material 340 may be discretely (e.g., discontinuously) formed. The rollable display panel 300 of the FIG. 7 may be rolled on the basis of the rolling or virtual axis V-AXIS. Thus, the curvature may decrease with increasing distance from the virtual axis V-AXIS. The resistance value of the resistor sensor of FIG. 7 may increase with increasing distance from the virtual axis V-AXIS because the area of the resistor material 340 decreases with increasing distance from the virtual axis V-AXIS. Here, the sensing material 340 that is discretely formed may be coupled by the first electrode 342 and the second electrode 344. Thus, the resistor sensor may be sensitively operated even if only weak pressure is applied to the area of which curvature is small because the resistance value of the resistor sensor increases as the curvature decreases. Thus, the resistor sensor may exactly detect the rolling area although the curvature is small.

Figure 8:
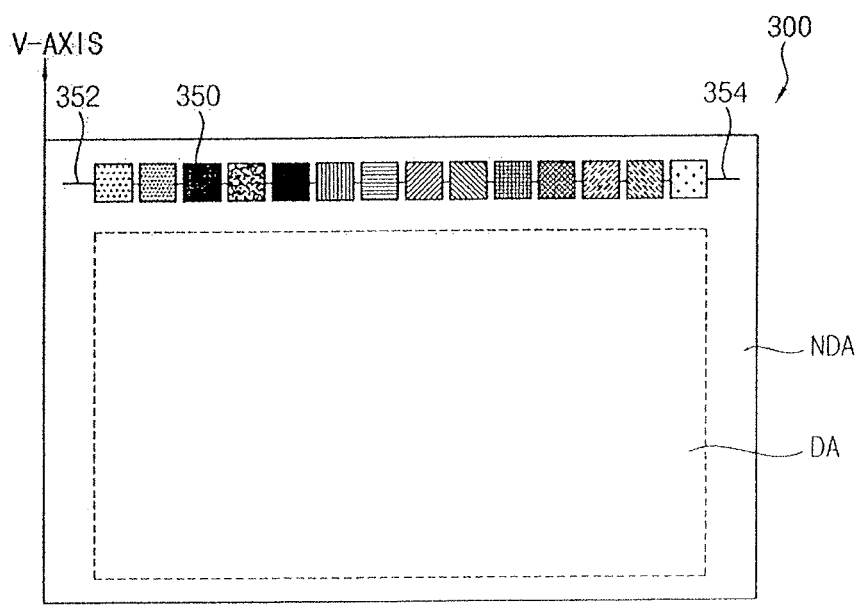
FIG. 8 illustrates another example embodiment of a resistor sensor included in the rollable display panel of FIG. 1.

FIG. 8 illustrates another example embodiment of a resistor sensor included in the rollable display panel of FIG. 1.

Referring to FIG. 8, the resistor sensor may be formed on the rollable display panel 300. The resistor sensor may include a sensing material 350, a first electrode 352, and a second electrode 354. The resistor sensor may have sensing materials of which resistance values are different from each other according to the curvature of the rollable display panel 300. The curvature may decrease with increasing distance from the rolling or virtual axis V-AXIS when the rollable display panel 300 is rolled on the basis of the virtual axis V-AXIS. The resistor sensor may include the sensing material 350 of which resistance value increases with increasing distance from the virtual axis V-AXIS. Therefore, the resistor sensor may be sensitively operated even if only weak pressure is applied to the area of which curvature is small because the resistance value of the resistor sensor increases as the curvature decreases. Thus, the resistor sensor may exactly detect the rolling area although the curvature is small. In an implementation, the sensing material 350 of the resistor sensor may be linearly (e.g., continuously) formed. In an implementation, the sensing material 350 of the resistor sensor may be discretely (e.g., discontinuously) formed. When the sensing material 350 is discretely formed, the sensing materials 350 may be coupled using the first electrode 352 and the second electrode 354. In an implementation, the discontinuously formed sensing material 350 may include a sequentially arranged plurality of different sensing materials such that a sensing material proximate to the rolling axis of the display has a sensitivity that is less than a sensitivity of a different sensing material distal to the rolling axis. For example, different sensing materials may be selected and arranged such that sensitivity of the resistor sensor increases with increasing distance from the rolling axis.

Figure 9A:
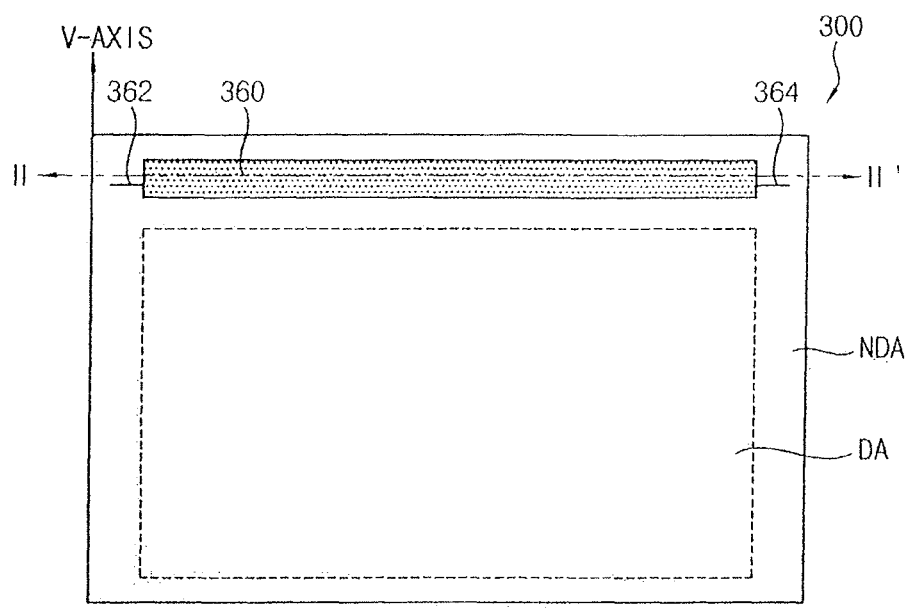
FIGS. 9A and 9B illustrate other example embodiment of a resistor sensor included in the rollable display panel of FIG. 1.
Figure 9B:
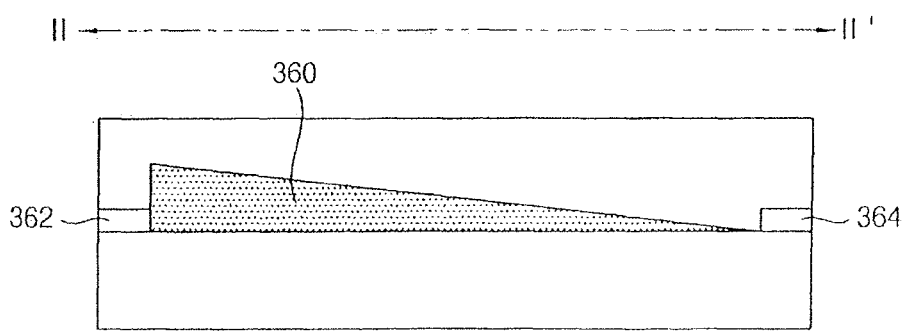

FIGS. 9A and 9B illustrate another example embodiment of a resistor sensor included in the rollable display panel of FIG. 1.

Referring to FIGS. 9A and 9B, the resistor sensor may be formed on the rollable display panel 300. The resistor sensor may include a sensing material 360, a first electrode 362, and a second electrode 364. A height (e.g., as measured from the substrate) of the sensing material may gradually or continuously decrease as the curvature decreases. Referring to FIGS. 9A and 9B, the sensing material 360 of the resistor sensor may be formed in a square shape. The height of the resistor sensor formed in the square shape may decrease with increasing distance from the rolling or virtual axis V-AXIS. The resistance value of the resistor sensor of FIGS. 9A and 9B may increase with increasing distance from the virtual axis V-AXIS because the resistance value decreases as the height of the sensing material 360 increases. Therefore, the resistor sensor may be sensitively operated even if only a weak pressure is applied to the area of which curvature is small because the resistance value of the resistor sensor increases as the curvature decreases. Thus, the resistor sensor may exactly or accurately detect the rolling area even when the curvature is small. In an implementation, the sensing material 360 of the resistor sensor of FIGS. 9A and 9B may be linearly formed. In an implementation, the sensing material 360 of the resistor sensor of FIGS. 9A and 9B may be discretely formed. When the sensing material 360 is discretely formed, the sensing material 360 may be coupled using the first electrode 362 and the second electrode 364.

Figure 10:
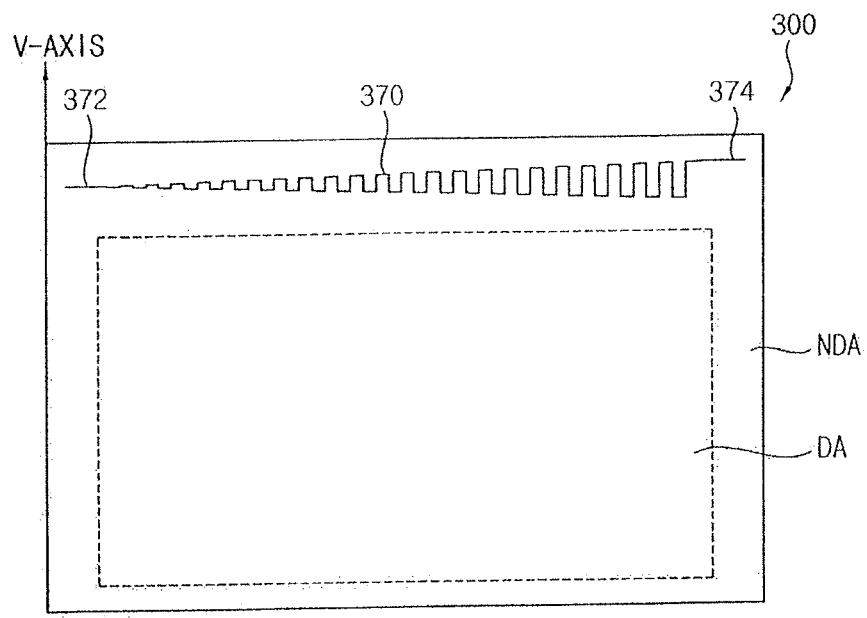
FIG. 10 illustrates another example embodiment of a resistor sensor included in the rollable display panel of FIG. 1.

FIG. 10 illustrates another example embodiment of a resistor sensor included in the rollable display panel of FIG. 1.

Referring to FIG. 10, the resistor sensor may be formed on the rollable display panel 300. The resistor sensor may include a sensing material 370, a first electrode 372, and a second electrode 374. The sensing material may be formed in a U shape of which the vertical length (e.g., length of arms of the U) gradually increases as the curvature decreases. Here, the sensing material 370 may include a metal material that is the same as the first electrode 372 and the second electrode 374. The rollable display panel 300 of the FIG. 10 may be rolled on the basis of the virtual axis V-AXIS. When the sensing material 370 includes the metal material, the resistance value may decrease as the vertical length of the sensing material 370 is short. The resistance value may increase with increasing distance from the virtual axis V-AXIS because the sensing material 370 has the U-shape of which vertical length gradually increases with increasing distance from the virtual axis V-AXIS. Therefore, the resistor sensor may be sensitively operated even if only weak pressure is applied to the area of which curvature is small because the resistance value of the resistor sensor increases as the curvature decreases. Thus, the resistor sensor may accurately detect the rolling area although the curvature is small.

Figure 11:
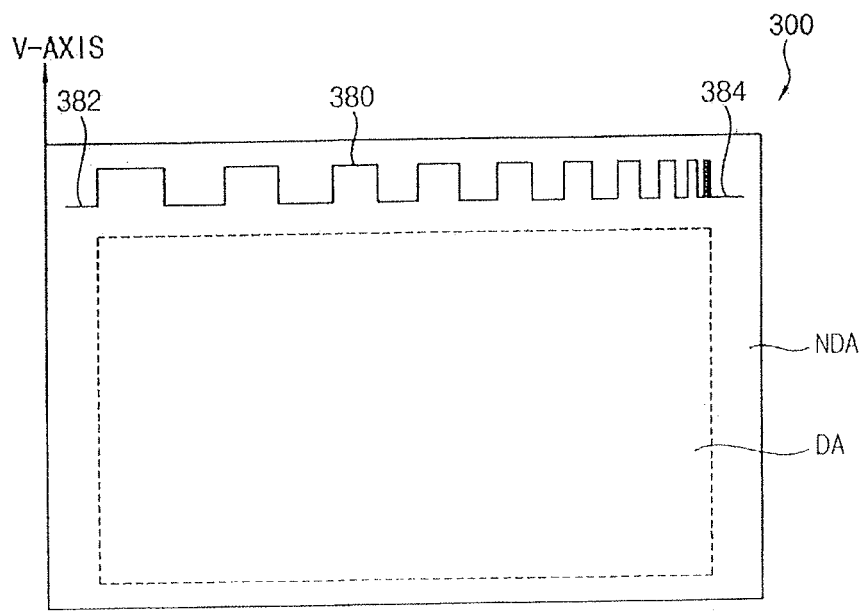
FIG. 11 illustrates another example embodiment of a resistor sensor included in the rollable display panel of FIG. 1.

FIG. 11 illustrates another example embodiment of a resistor sensor included in the rollable display panel of FIG. 1.

Referring to FIG. 11, the resistor sensor may be formed on the rollable display panel 300. The resistor sensor may include a sensing material 380, a first electrode 382, and a second electrode 384. The sensing material 380 of the resistor sensor may be formed in a U shape of which horizontal width (e.g., distance between arms of the U) gradually decreases as the curvature decreases. Here, the sensing material 380 may include a metal material that is the same as the first electrode 382 and the second electrode 384. The rollable display panel 300 of the FIG. 11 may be rolled on the basis of the virtual axis V-AXIS. When the sensing material 380 includes the metal material, the resistance value may decrease as the horizontal width of the sensing material 380 is short. The resistance value may increase with increasing distance from the virtual axis V-AXIS because the sensing material 380 has the U-shape of which horizontal width gradually decreases with increasing distance from the virtual axis V-AXIS. Therefore, the resistor sensor may be sensitively operated even if only weak pressure is applied to the area of which curvature is small because the resistance value of the resistor sensor increases as the curvature decreases. Thus, the resistor sensor may exactly detect the rolling area although the curvature is small.

Figure 12:
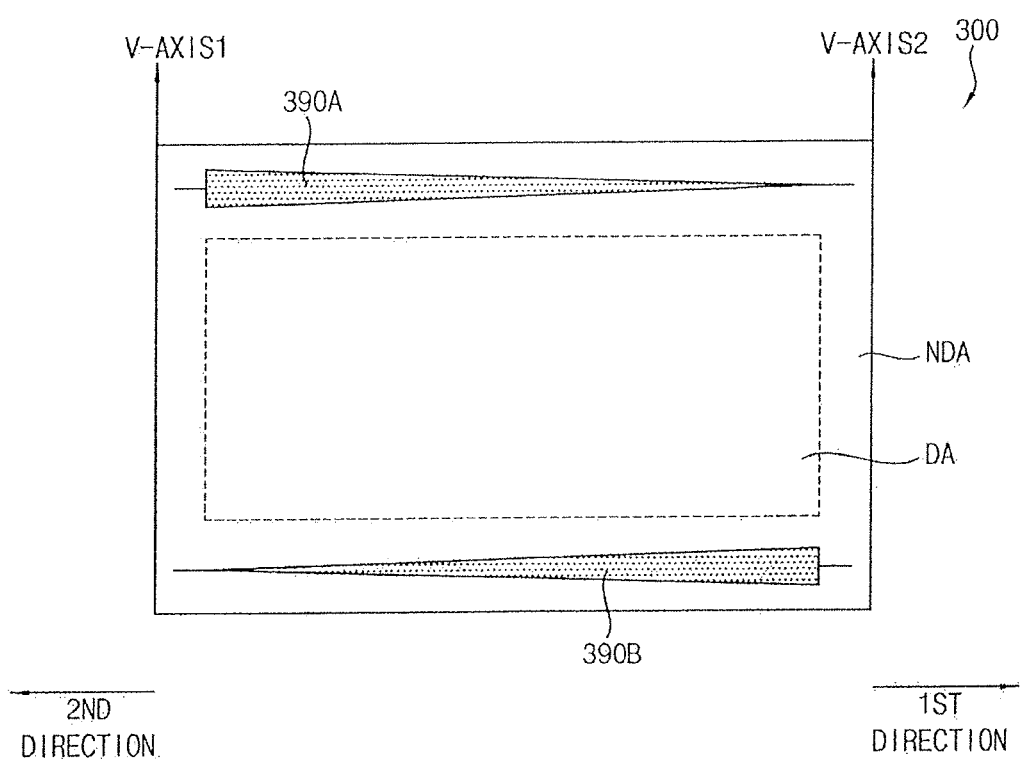
FIG. 12 illustrates another example embodiment of a resistor sensor included in the rollable display panel of FIG. 1.

FIG. 12 illustrates another example embodiment of a resistor sensor included in the rollable display panel of FIG. 1.

Referring to FIG. 12, the resistor sensor may be formed on the rollable display panel 300. The resistor sensor may be formed in a non-display region NDA on one side of the display region DA and in the non-display region NDA on the other side of the display region DA. The rollable display panel 300 of FIG. 12 may be rolled on the basis of a first rolling virtual axis V-AXIS1 and/or a second rolling virtual axis V-AXIS2. For example, the rollable display panel 300 may be rolled to a first direction 1ST DIRECTION and/or a second direction 2ND DIRECTION. Referring to FIG. 12, the area of the sensing material 390A at one side of the display region DA may decrease with increasing distance from the first virtual axis V-AXIS1 and the area of the sensing material 390B at the other side of the display region DA may decrease with increasing distance from the second virtual axis V-AXIS2. Thus, the resistor sensor may exactly detect the rolling area when the rollable display panel 300 is rolled to the first direction 1ST DIRECTION or the second direction 2ND DIRECTION.

Figure 13:
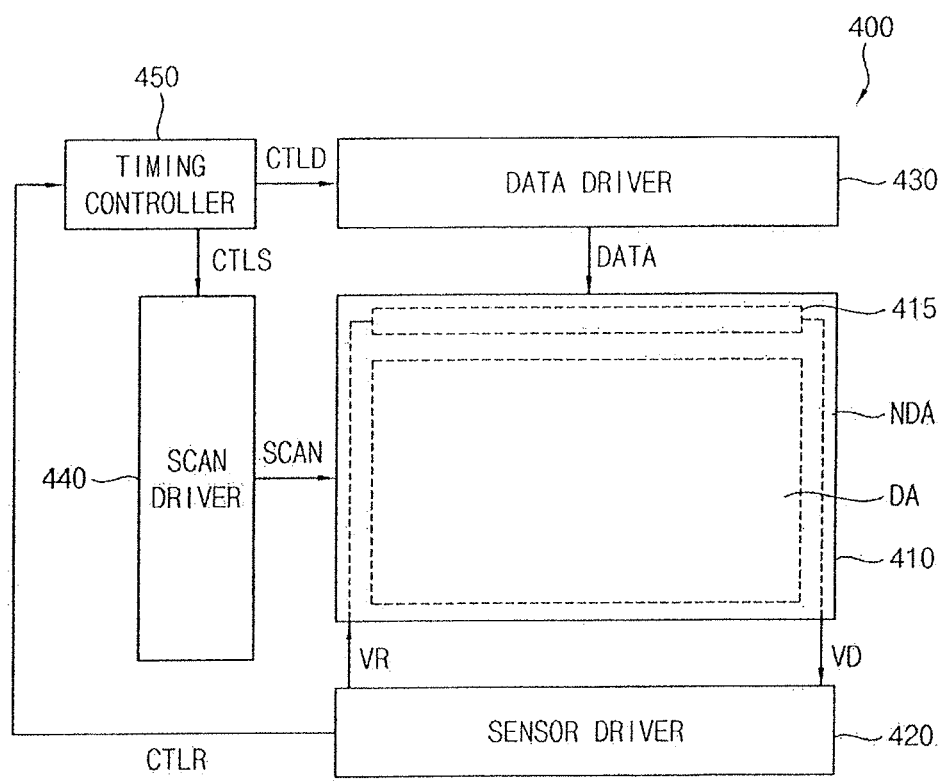
FIG. 13 illustrates a block diagram of a rollable display device according to example embodiments.
Figure 14:
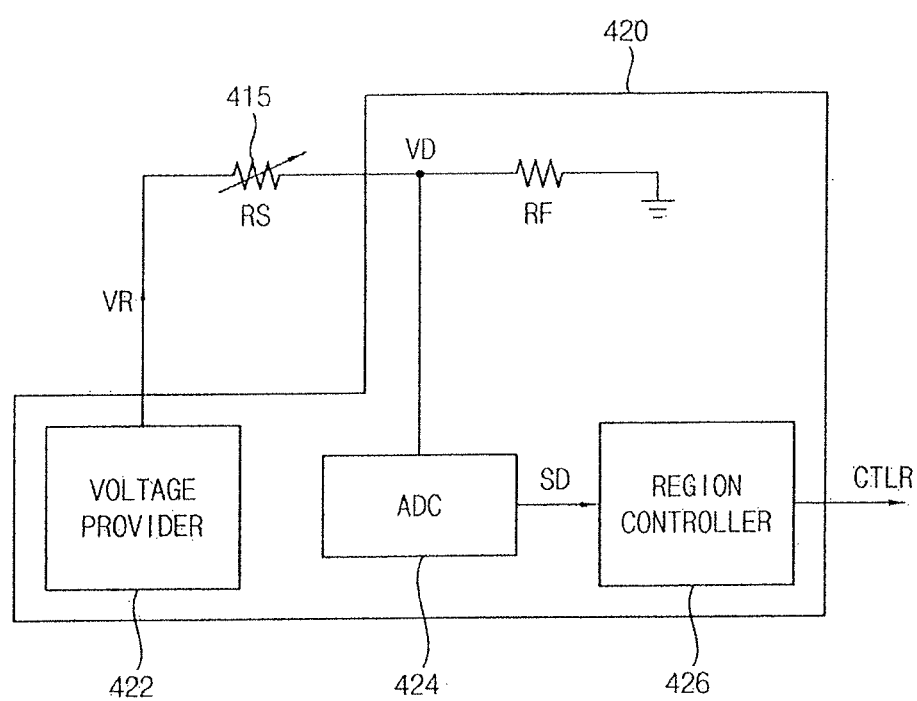
FIG. 14 illustrates a block diagram of a sensor driver included in the rollable display device of FIG. 13.

FIG. 13 illustrates a block diagram of a rollable display device according to example embodiments and FIG. 14 illustrates a block diagram of a sensor driver included in the rollable display device of FIG. 13.

Referring to FIG. 13, a rollable display device 400 may include a rollable display panel 410, a resistor sensor 415, a sensor driver 420, a data driver 430, a scan driver 440, and a timing controller 450.

The rollable display panel 410 may include a display region DA and a non-display region NDA. The rollable display panel 410 may be rolled or unrolled on a basis of a rolling or virtual axis. The display region DA and the non-display region NDA may be formed on a substrate having flexibility.

An image may be displayed on the display region DA. A plurality of pixels may be formed on the display region DA. Each of the pixels may be formed in intersection regions of a data line and a scan line. Each of the pixels may emit light in response to a data signal provided through the data line. The non-display region NDA may surround the display region. A circuit providing signals to the pixels, pads coupling the rollable display panel 410 and an external integrated circuit may be formed in the non-display region NDA.

The resistor sensor 415 may be disposed in the non-display region. A resistance value of the resistor sensor 415 may be different or vary according to a curvature of the rollable display panel 410 when the rollable display panel 410 is rolled or unrolled. An inner curvature and an outer curvature may be different when the rollable display panel 410 is rolled. A rolling area (e.g., a portion of the display panel that is in a rolled state in relation to a portion of the display panel in an unrolled or flattened state) may not be exactly or accurately detected if the resistance value of the resistor sensor were to be the same because a change amount of the resistance value could be too small to detect in the region of which curvature is small. The rollable display device 400 of FIG. 13 may accurately detect the rolling area by including the resistor sensor 415 of which the resistance values are different from each other according to the curvature. The resistor sensor 415 may output a sensing signal that is regularly changed proportional to a rolling length of the rollable display panel 410. The resistor sensor 415 may include a sensing material of which resistance values are different by location. The resistor sensor 415 may output the sensing signal based on a sum of the resistance values of the sensing material. For example, the resistor sensor 415 may output a sum of the resistance values of the sensing material or may output a variation of the sum of the resistance values as the sensing signal.

The resistor sensor 415 may further include a first electrode and a second electrode. The resistor sensor 415 may further include an insulation layer on the first electrode, the second electrode, and the sensing material. Pressure may be applied to the sensing material disposed in a rolling area of the rollable display panel 410 and the resistance value of the sensing material may change according to a pressure applied thereto. The pressure applied to the sensing material may be different according to a curvature of the rollable display panel 410 when the rollable display panel 410 is rolled or unrolled. When the resistor sensor 415 includes the sensing material of which the resistance values are the same by the location, the variation of the resistance value may be different as a rolling length of the rollable display panel 410 increases or decreases because the pressure applied to the sensing material are different according to the curvature of the rollable display panel 410. When the resistor sensor 415 includes the sensing material of which the resistance value are different by the location according to example embodiments, the variation of the resistance value may be regularly changed as the rolling length of the rollable display panel 410 increases or decreases although the pressure applied to the sensing material are the same. Specifically, the variation of the resistance value of the resistor sensor 415 of which the curvature is big may be small when the sensing material of which the resistance value is small is disposed although the pressure applied thereto is big. Further, the variation of the resistance value of the resistor sensor 415 of which the curvature is small may be big when the sensing material of which the resistance value is big is disposed although the pressure applied thereto is small. Therefore, the resistor sensor may output the sensing signal that is regularly changed proportional to the rolling length of the rollable display panel 410.

The first electrode and the second electrode may be coupled to the sensor driver 420 coupled to the rollable display panel 410. The resistance value of the sensing material may be changed according to an external pressure. An amount of change of the resistance value corresponding to the external pressure may increase as the resistance value of the resistor sensor 415 increases. For example, sensitivity of the resistor sensor 415 corresponding to the pressure may increase. In contrast, the amount of change of the resistance value corresponding to the external pressure may decrease as the resistance value of the resistor sensor 415 decreases. For example, the sensitivity of the resistor sensor 415 corresponding to the pressure may decrease. The rollable display panel 410 may form the resistor sensor 415 of which the resistance value decreases as the curvature increases to facilitate an increase in the sensitivity of the resistor sensor 415 as the curvature decreases. Therefore, the rollable display device 400 may accurately detect rolling region or rolling area of the rollable display panel 410 even if the curvature is small. Here, the resistance value of the resistor sensor 415 may decrease as an area of the sensing material increases.

In an implementation, the sensing material may be formed in a triangle shape of which an area is gradually or continuously decreased as the curvature is decreased. In an implementation, the second material having the triangle shape may be linearly or discretely formed. In an implementation, the resistor sensor 415 may include sensing materials of which the resistance values are different from each other according to the curvature of the rollable display panel 410. For example, the resistor sensor 415 may include sensing materials having a resistance value that decreases as the curvature increases. For example, the resistor sensor 415 may include a sensing material having the smallest resistance value in the area of which curvature is the biggest. The resistor sensor 415 may include a sensing material having the biggest resistance value in the area of which curvatures is the smallest. In an implementation, the resistor sensor 415 may include the sensing material of which a height gradually decreases as the curvature decreases. Here, the sensing material may be linearly or discretely formed. In an implementation, the resistor sensor 415 may be formed in a U shape of which vertical length gradually increases or of which horizontal width gradually decreases as the curvature decrease. The U shape may have concave portions and protrusion portions. In an implementation, the sensing material may include a metal material that is the same as the first electrode and the second electrode.

In an implementation, the resistor sensor 415 may be formed in the non-display region NDA at a side of the display region DA. In an implementation, the resistor sensor 415 may be formed in the non-display region NDA at both side of the display region DA. Here, the resistance value of the resistor sensor 415 in the non-display region NDA at one side of the display region may increase according to a first direction, and the resistance value of the resistor sensor 415 in the non-display region NDA at the other side of the display region DA may increase according to a second direction opposite to the first direction. Thus, the rolling area of the rollable display panel 410 may be exactly detected when the rollable display panel is rolled in either of two direction (e.g., the first direction and the second direction).

The sensing material may include various materials. As described above, the sensing material may include the metal material when the sensing material is formed in the U shape. In an implementation, the metal material may include at least one of titanium (Ti), molybdenum (Mo), copper (Cu), aluminum (Al), etc. In an implementation, the sensing material may include at least one of lead zirconate titanate (PZT) and polyvinylidene fluoride (PVDF). In an implementation, the sensing material may include at least one of low-temperature poly silicon (LTPS), molybdenum disulfide (MoS2), and amorphous silicon (a-Si). In this case, the resistor sensor 415 may be formed in a manufacture process of forming pixels of the rollable display panel 410 using low-temperature poly silicon (LTPS), molybdenum disulfide (MoS2), and amorphous silicon (a-Si). In an implementation, the sensing material may include at least one of a metal nanowire, a metal nanoparticle, silicon (Si), a carbon nanotube (CNT), indium tin oxide (ITO), graphene, and indium gallium zinc oxide (IGZO). In this case, the resistor sensor 415 may be implemented as a film and may be attached to the rollable display panel 410. In an implementation, the resistor sensor may be integrated in a touch sensor panel and be attached to the rollable display panel 410.

The sensor driver 420 may detect a variation of the resistance value of the resistor sensor 415 and determine a driving region (e.g., an unrolled or flat area) of the rollable display panel 410. FIG. 14 illustrates an example of the sensor driver 420 when the resistor sensor 415 outputs the sum of the resistance value of the sensing materials as the sensing signal. Here, the resistor sensor may be implemented as a various resistor. Referring to FIG. 14, the sensor driver 420 may include a voltage provider 422, an analog-digital converter 424, and a region controller 426. The sensor driver 420 may be coupled to the resistor sensor 415. Here, the resistor sensor 415 of FIG. 14 may correspond to the resistor sensor 415 of FIG. 13.

The voltage provider 422 may provide a reference voltage VR to the resistor sensor 415. The voltage provider 422 may be coupled to the first electrode of the resistor sensor 415. The analog-digital converter 424 may convert a voltage output from the resistor sensor 415 into a detecting signal SD that is a digital signal. The analog-digital converter 424 may be coupled to the second electrode of the resistor sensor 415. The sensor driver 420 may further include a filter resistor VF. The reference voltage VR may be divided by the resistor sensor 415 and the filter resistor VF. The voltage output from the resistor sensor 415 may be provided to the analog-digital converter 424 as a detecting voltage VD. The detecting voltage VD may be changed according to the curvature of the rollable display panel 410. The analog-digital converter 424 may convert the detecting voltage VD into the detecting signal SD that is the digital signal. The region controller 426 may control an operation region of the rollable display panel 410 based on the detecting signal SD. Further, the region controller 426 may control an operation region of a touch panel. The region controller 426 may provide a region control signal CTLR corresponding to the detecting signal SD to the timing controller 450.

The timing controller 450 may generate control signals that control the data driver 430 and the scan driver 440 based on the region control signal CTLR. The timing controller 450 may allow the display panel 410 to display an image on (e.g., only on) the unrolled region. Further, the timing controller 450 may allow the touch panel to be operated in (e.g., only in) the unrolled region. The data driver 430 may provide the data signal DATA to the pixels through the data liens based on the data control signal CTLD and the scan signal SCAN.

As described above, the rollable display device 400 of FIG. 13 may exactly detect the rolled region and the unrolled region by including the resistor sensor 415 of which resistance values are different according to the curvature.

Figure 15A:
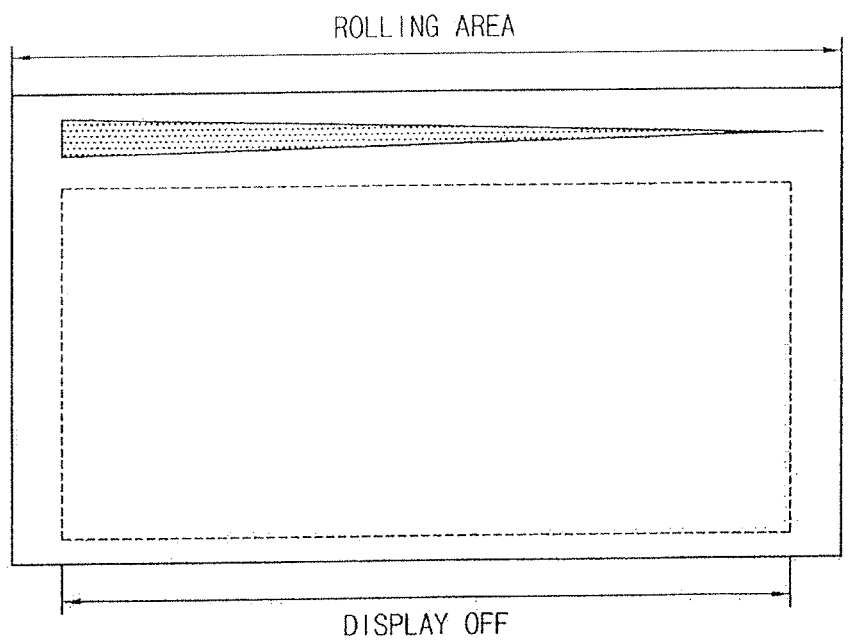
FIGS. 15A through 15C illustrate diagrams for describing an example of an operation of the rollable display device of FIG. 13.
Figure 15B:
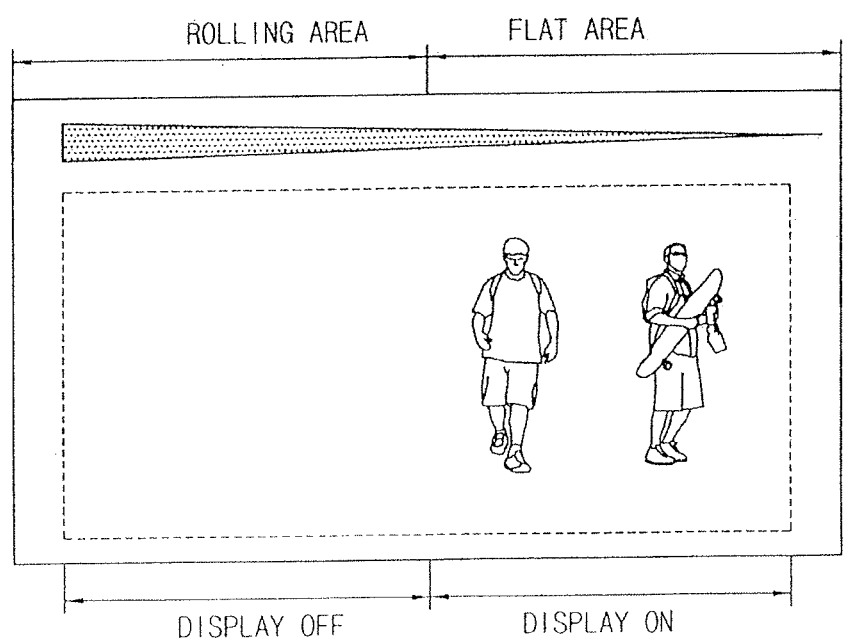
Figure 15C:
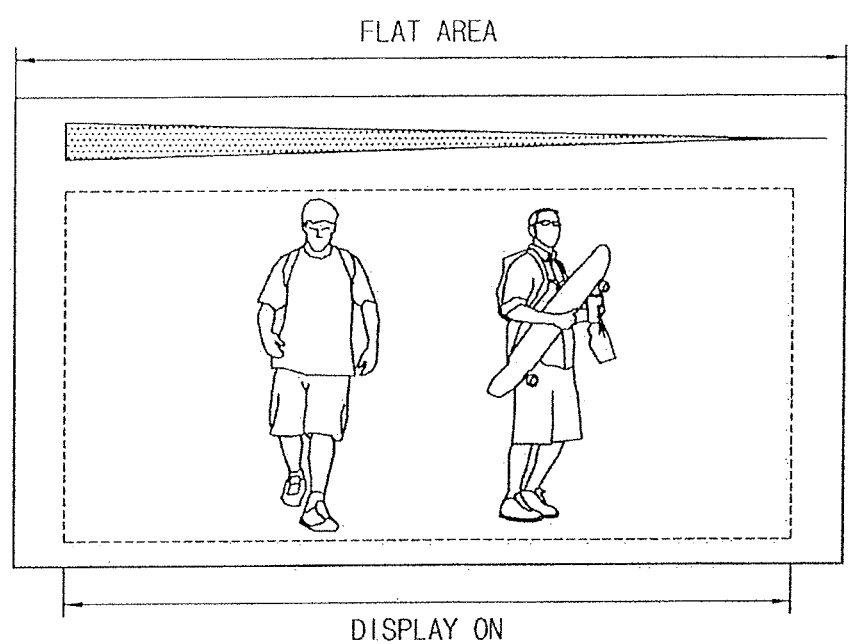

FIGS. 15A through 15C illustrate diagrams for describing an example of an operation of the rollable display device of FIG. 13.

FIG. 15A illustrates a schematic diagram in which the rollable display device is completely rolled. When the rollable display device is completely rolled, the rollable display panel may not be driven based on the region control signal provided from the sensor driver. For example, the entire display area may be rolled around the rolling axis and the entire display area may have a curvature (e.g., may be curved). For example, when it is determined that every part of the rollable display device has a curvature that is indicative of being rolled around the rolling axis (e.g., that the entire device is completely rolled up and unused), the display area may not be operable or operated.

FIG. 15B illustrates a schematic diagram in which the rollable display device is partially rolled. The sensor driver may determine the driving region of the rollable display panel based on the variation of the detecting voltage. The timing controller may drive the unrolling region of the rollable display panel based on the region control signal provided from the sensor driver. For example, power consumption of the rollable display device may decrease because the image may be displayed only on the unrolling region of the rollable display panel. For example, in the display device, portions of the display area that are curved, e.g., that remain rolled around the rolling axis, may exhibit a particular resistance value such that the display is not activated in such rolled regions. Portions of the display device that are relatively flat, e.g., that are unrolled from the device and are not rolled around the rolling axis, may exhibit another particular resistance value (e.g., indicative of the portion of the display device being unrolled and in use) such that the display is activated in the desired relatively flat display regions.

FIG. 15C illustrates a schematic diagram in which the rollable display device is completely unrolled. When the rollable display device is completely unrolled, the rollable display panel may display the image based on the region control signal provided from the sensor driver. For example, in the display device, all of the display area may be in the relatively flat, completely unrolled state (e.g., not rolled around the rolling axis at all), and may exhibit a particular resistance value such that the entire display is activated in the relatively flat display region.

Figure 16A:
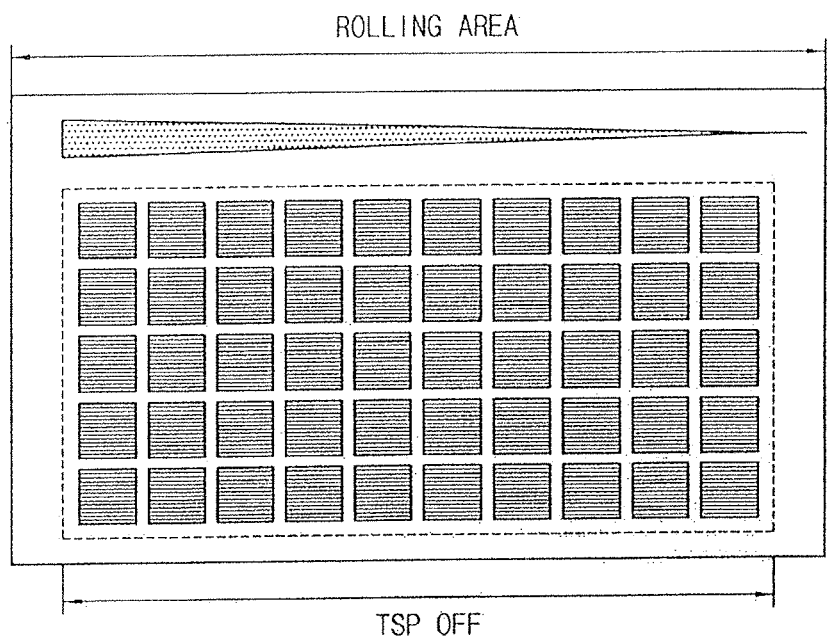
FIGS. 16A through 16C illustrate diagrams for describing another example of an operation of the rollable display device of FIG. 13.
Figure 16B:
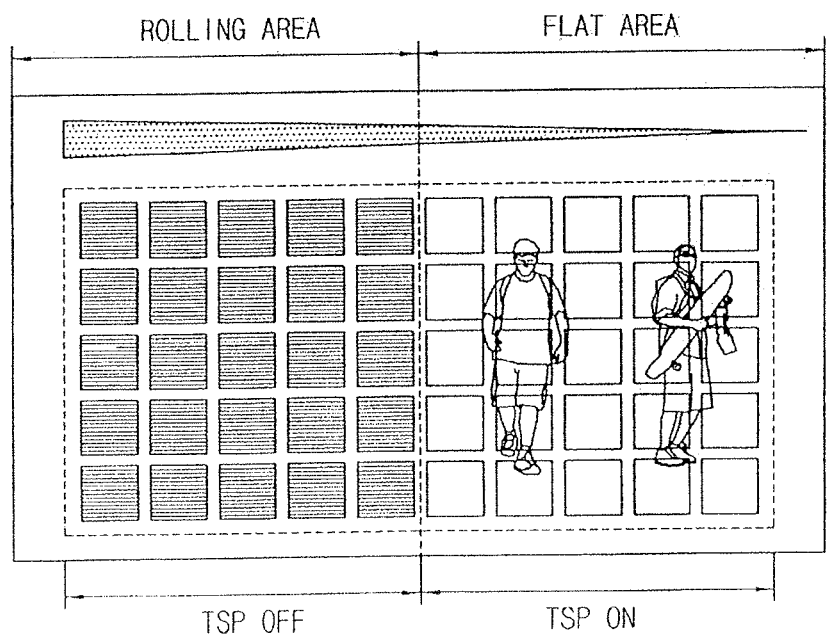
Figure 16C:
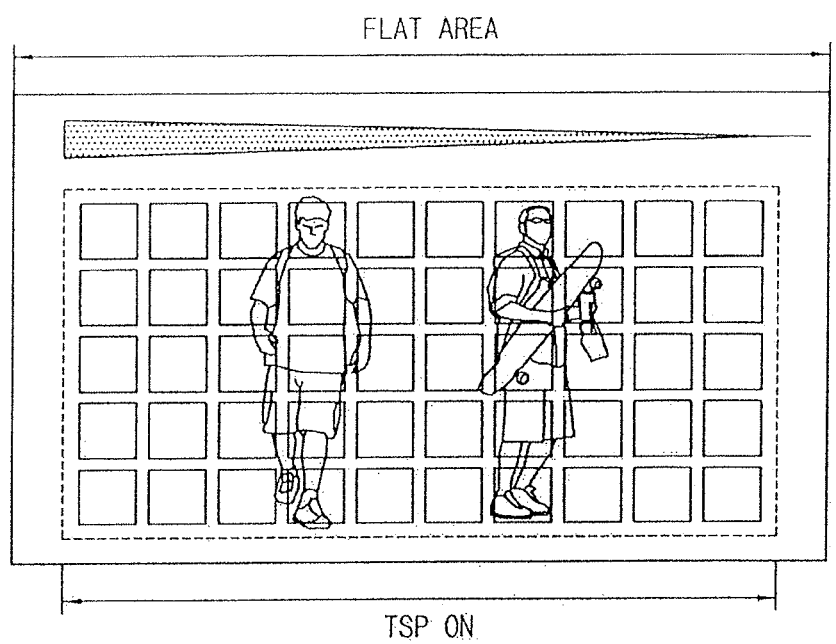

FIGS. 16A through 16C illustrate diagrams for describing another example of an operation of the rollable display device of FIG. 13.

The rollable display device may include the touch panel. The touch panel may be formed in a manufacturing process of the rollable display panel or may be attached on the rollable display panel by being implemented as a film. The sensor driver may provide the region control signal that controls the operation region of the touch panel (e.g., separately or independently from the display or in conjunction with operation of the display) based on the detecting signal to the timing controller. The timing controller may control the operation of the touch panel based on the region control signal.

FIG. 16A illustrates a schematic diagram in which the rollable display device is completely rolled. When the rollable display device is completely rolled, the touch panel may not be operated based on the region control signal provided from the sensor driver. For example, when it is determined that every part of the rollable display device has a curvature that is indicative of being rolled around the rolling axis (e.g., that the entire device is completely rolled up and unused), the touch panel may not be operable or operated.

FIG. 16B illustrates a schematic diagram in which the rollable display device is partially rolled. The sensor driver may determine the driving region of the touch panel based on the variation of the detecting voltage. The timing controller may drive (e.g., only) the unrolling region of the touch panel based on the region control signal provided from the sensor driver. For example, power consumption of the rollable display device may decrease because the touch panel is not operated in the rolling region (e.g., and only operating as necessary in the relatively flat area). For example, in the display device, portions of the touch panel that are curved, e.g., that remain rolled around the rolling axis, may exhibit a particular resistance value such that the touch panel is not activated in such rolled regions. Portions of the display device that are relatively flat, e.g., that are unrolled from the device and are not rolled around the rolling axis, may exhibit another particular resistance value (e.g., indicative of the portion of the display device being unrolled and in use) such that the touch panel is activated in the desired relatively flat display regions.

FIG. 16C illustrates a schematic diagram in which the rollable display device is completely unrolled. When the rollable display device is completely unrolled, the (e.g., entire) touch panel may be operated based on the region control signal provided from the sensor driver.

Figure 17A:
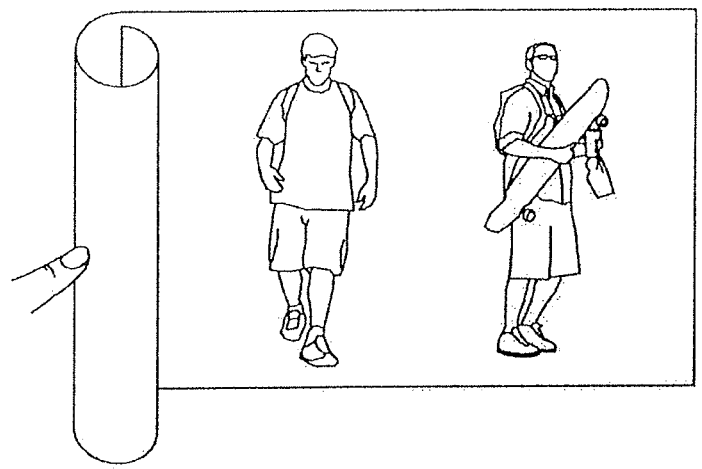
FIGS. 17A and 17B illustrate diagrams for describing another example of an operation of the rollable display device of FIG. 13.
Figure 17B:
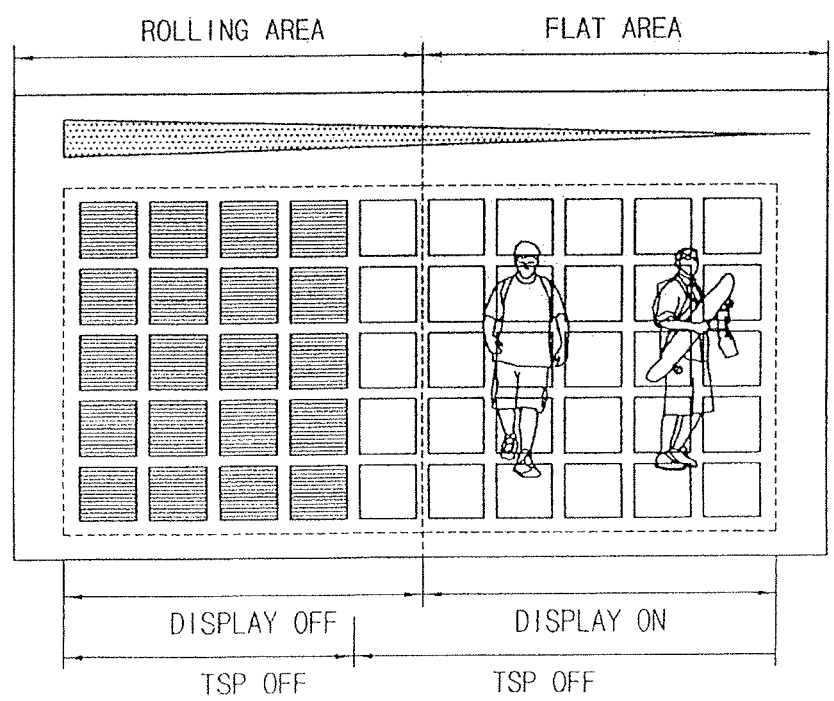

FIGS. 17A and 17B illustrate diagrams for describing another example of an operation of the rollable display device of FIG. 13.

When the rollable display device is partially rolled, the touch panel in the rolling region may be operated as described in FIG. 17A. For example, a mouse pointer displayed on the unrolling (e.g., relatively flat) region may be controlled by portions of the touch panel in the rolling (e.g., rolled) region. The sensor driver may independently determine the driving region of the rollable display panel and the operation region of the touch panel. The timing controller may display the image on the unrolling region of the rollable display panel based on the region control signal provided from the sensor driver. Further, the timing controller may operate the touch panel in the rolling region and in the unrolling region based on the region control signal provided from the sensor driver. As described above, the driving region of the rollable display panel and the operation region of the touch panel may be respectively and independently controlled as described in FIG. 17B. For example, an operating area of the touch panel may be different from (e.g., may be larger than) a display area of the display panel.

Figure 18:
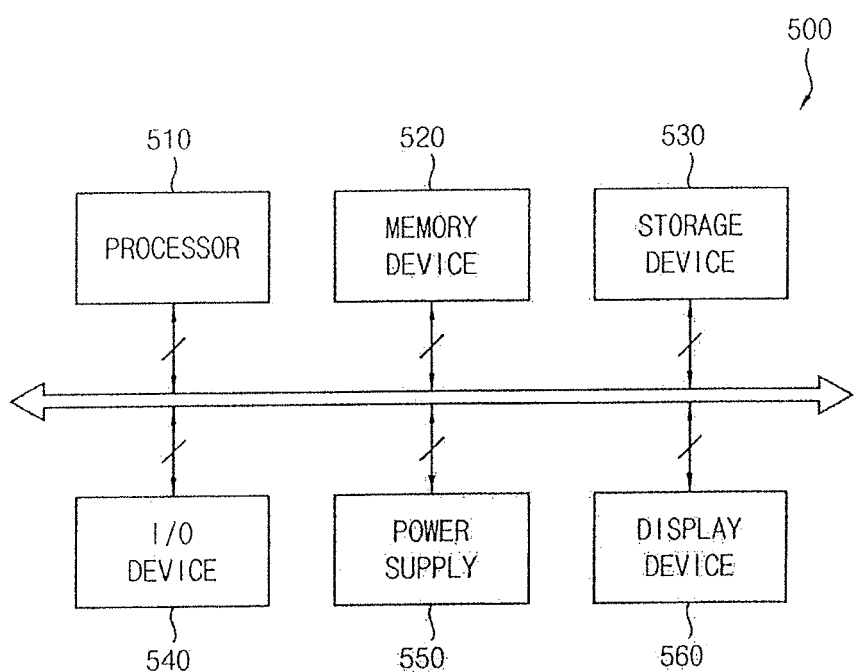
FIG. 18 illustrates a block diagram of the electronic device of FIG. 13 that includes the rollable display device of FIG. 13.
Figure 19:
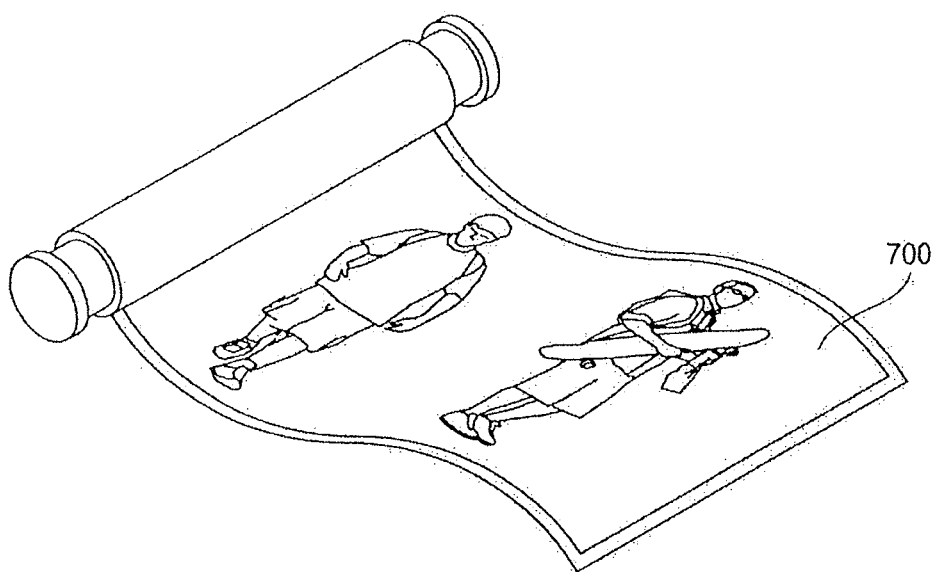
FIG. 19 illustrates a perspective view of the electronic device of FIG. 18.

FIG. 18 illustrates a block diagram of an electronic device of FIG. 13 that includes the rollable display device of FIG. 13 and FIG. 19 illustrates a perspective view of the electronic device of FIG. 18.

Referring to FIG. 18, an electronic device 500 may include a processor 510, a memory device 520, a storage device 530, an input/output (I/O) device 540, a power device 550, and a display device 560. Here, the display device 560 may correspond to the rollable display device 400 of FIG. 13. In addition, the electronic device 500 may further include a plurality of ports for communicating a video card, a sound card, a memory card, a universal serial bus (USB) device, other electronic device, etc. Although it is illustrated in FIG. 19 that the electronic device 500 is implemented as a rollable display device 600, a kind of the electronic device 500 is not limited thereto.

The processor 510 may perform various computing functions. The processor 510 may be a micro processor, a central processing unit (CPU), etc. The processor 510 may be coupled to other components via an address bus, a control bus, a data bus, etc. Further, the processor 510 may be coupled to an extended bus such as surrounded component interconnect (PCI) bus. The memory device 520 may store data for operations of the electronic device 500. For example, the memory device 520 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc. The storage device 530 may be a solid stage drive (SSD) device, a hard disk drive (HDD) device, a CD-ROM device, etc.

The I/O device 540 may be an input device such as a keyboard, a keypad, a touchpad, a touch-screen, a mouse, etc., and an output device such as a printer, a speaker, etc. In some example embodiments, the display device 560 may be included in the I/O device 540. The power device 550 may provide a power for operations of the electronic device 500. The display device 560 may communicate with other components via the buses or other communication links. As described above, the display device 560 may include a rollable display panel, a resistor sensor, a sensor driver, and a timing controller.

The rollable display panel may include a display region and a non-display region. An image may be displayed on the display region. A resistor sensor may be disposed in the non-display region. A resistance value of the resistor sensor may be different according to a curvature of the rollable display panel when the rollable display panel is rolled. The resistor sensor may include a first electrode, a second electrode, and a sensing material. A resistance value of the resistor sensor may decrease as a curvature of the rollable display panel increases. For example, an area, a height, a width, etc. of the sensing material may gradually decrease as the curvature decrease. For example, when the resistance value of the resistor sensor increases, an amount of change of the resistance value may increase. In an implementation, the resistor sensor may be formed in the non-display region at a side of the display region. In an implementation, the resistor sensor may be formed in the non-display region at both sides of the display region. Thus, the rolling area of the rollable display panel may be exactly detected when the rollable display panel is rolled in either of two directions. The resistor sensor may be formed on the rollable display panel or may be attached to the rollable display panel as being implemented as a film. The sensor driver may detect a variation of the resistance value of the resistor sensor and determine a driving region (e.g., an unrolling area) of the rollable display panel. A voltage provider of the sensor driver may provide a reference voltage to the resistor sensor and provide a detecting voltage that is divided by the resistor sensor and a filter resistor to an analog-digital converter. The analog-digital converter may convert the detecting voltage that is an analog signal into a detecting signal that is digital signal and provide the detecting signal to a region controller. The region controller may provide a region control signal that controls a driving region of the rollable display panel and an operation region the touch panel based on the detecting signal. The timing controller may generate control signals that control the data driver and the scan driver based on the region control signal provided from the sensor driver. The timing controller may display the image or operate touch panel in the unrolling region of the rollable display panel.

As described above, the electronic device 500 of FIG. 18 may accurately detect the rolling region by including the display device 560 that includes the resistor sensor of which the resistance value are different according to the curvature. As shown in FIG. 19, an image may be displayed on an unrolled region 700 of the device. For example, the device according to an embodiment may accurately detect the small differences between the curvature of outer portions of the rolled display device (e.g., at which it would not be desirable to display an image) and the curvature of unrolled portions of the display device (e.g., which, as shown in FIG. 19, may not be completely flat when it is desired to display an image thereon). For example, the resistor sensor may be sensitive enough to make the difficult determination between which portions of the device are in a rolled state and which portions are in an unrolled state.

The embodiments may be applied to a rollable display device and an electronic device having the display device. For example, the embodiments may be applied to a computer monitor, a laptop, a digital camera, a cellular phone, a smart phone, a smart pad, a television, a personal digital assistant (PDA), a portable multimedia player (PMP), a MP3 player, a navigation system, a game console, a video phone, etc.

By way of summation and review, power consumption of a rollable display may be decreased by not driving the partial of the display panel that is rolled.

The embodiments may provide a rollable display panel capable of exactly detecting a spreading area and a rolling area.

A rollable display panel and a rollable display according to an embodiment may accurately detect a rolling area by including a resistor sensor of which resistance value are different according to a curvature of the rollable display panel.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
    a rollable display panel including a display region and a non-display region adjacent to the display region;
    a sensor in the non-display region, wherein the sensor outputs a sensing signal which is changed according to rolling degree of the rollable display panel; and
    a sensor driver that determines a driving region of the rollable display panel based on the sensing signal,
    wherein:
    the sensor includes a sensing pattern,
    the sensing signal is a resistance value of the sensing pattern, and
    the resistance value changes according to a pressure applied thereto.

2. The display device as claimed in claim 1, wherein the sensing signal is changed proportional to the rolling degree of the rollable display panel.

3. The display device as claimed in claim 1, wherein the sensor further includes a first electrode and a second electrode coupled to ends of the sensing pattern.

4. The display device as claimed in claim 1, wherein width or thickness of the sensing pattern varies according to a location along a length direction of the sensor.

5. The display device as claimed in claim 1, wherein the resistance value of the sensing pattern of the sensor decreases as a curvature of the rollable display panel increases.

6. The display device as claimed in claim 1, wherein the sensor driver comprises:
    a voltage provider configured to provide a reference voltage to the sensor;
    an analog-digital converter configured to convert a voltage output from the sensor to a detecting signal that is a digital signal; and
    a region controller configured to control a driving region of the rollable display panel based on the detecting signal.

7. The display device of claim 6, further comprising a touch panel on the rollable display panel, and
    wherein the region controller controls an operation region of the touch panel.

* * * * *